United States Patent
Nagami et al.

(10) Patent No.: US 8,528,965 B2
(45) Date of Patent: Sep. 10, 2013

(54) OPERATOR'S CAB FOR A WORK VEHICLE

(75) Inventors: Kouji Nagami, Hirakata (JP); Makoto Yomogita, Hirakata (JP); Masamichi Miyazaki, Neyagawa (JP); Shinji Hirose, Osaka (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 13/376,050

(22) PCT Filed: May 26, 2010

(86) PCT No.: PCT/JP2010/058886
§ 371 (c)(1),
(2), (4) Date: Dec. 2, 2011

(87) PCT Pub. No.: WO2010/140514
PCT Pub. Date: Dec. 9, 2010

(65) Prior Publication Data
US 2012/0086236 A1    Apr. 12, 2012

(30) Foreign Application Priority Data
Jun. 3, 2009  (JP) .................................. 2009-134400

(51) Int. Cl.
*B62D 25/20* (2006.01)
*B62D 33/06* (2006.01)

(52) U.S. Cl.
USPC ................ 296/190.09; 296/190.11; 296/208

(58) Field of Classification Search
USPC ............ 296/190.01, 190.08, 190.09, 190.11, 296/208; 165/42
See application file for complete search history.

(56) References Cited

U.S. PATENT DOCUMENTS

| | | | |
|---|---|---|---|
| 4,211,364 | A | 7/1980 | Sickler |
| 2004/0217630 | A1 | 11/2004 | Takeuchi et al. |
| 2006/0170251 | A1 | 8/2006 | Ishii et al. |
| 2010/0102594 | A1 | 4/2010 | Kimura et al. |
| 2011/0241380 | A1 | 10/2011 | Mayr et al. |

FOREIGN PATENT DOCUMENTS

| | | |
|---|---|---|
| CN | 1701019 A | 11/2005 |
| EP | 1 609 701 A1 | 12/2005 |
| EP | 2 180 100 A1 | 4/2010 |
| FR | 2 057 515 A5 | 5/1971 |
| JP | 2002-173950 A | 6/2002 |
| JP | 2004-306911 A | 11/2004 |
| JP | 2005-330771 A | 12/2005 |
| JP | 2006-123625 A | 5/2006 |
| WO | WO 2004/078562 A1 | 9/2004 |
| WO | WO 2010/049380 A1 | 5/2010 |

OTHER PUBLICATIONS

International Search Report dated Aug. 31, 2010 issued in International Appln. No. PCT/JP2010/058886.

(Continued)

*Primary Examiner* — Dennis Pedder
(74) *Attorney, Agent, or Firm* — Holtz, Holtz, Goodman & Chick, PC

(57) ABSTRACT

The operator's cab 8 is provided with a floor frame 10 having an opening for maintenance 20 located at a floor base 10*a* and a lid body 23 for closing the opening for maintenance 20. The lid body 23 includes an upper inspection cover 22 and a lower inspection cover 21 which are aligned in a vertical direction with spacing so as to be attachable and detachable relative to the opening for maintenance 20. Disposed in a space between the upper inspection cover 22 and the lower inspection cover 21 is a floor duct 30 that can be disassembled and is provided for circulating supply air sent from an air conditioner 27.

3 Claims, 6 Drawing Sheets

(56) References Cited

OTHER PUBLICATIONS

International Preliminary Report on Patentability (IPRP) and Written Opinion dated Jan. 26, 2012 (in English) issued in counterpart International Application No. PCT/JP2010/058886.

Extended European Search Report (EESR) dated Sep. 19, 2012 (in English) issued in counterpart European Application No. 10783298.2.

Chinese Office Action dated Mar. 5, 2013 (and English translation thereof) issued in counterpart Chinese Application No. 201080023007.5.

OPERATOR'S CAB FOR A WORK VEHICLE

This application is a U.S. National Phase Application under 35 USC 371 of International Application PCT/JP2010/058886 filed May 26, 2010.

TECHNICAL FIELD

The present invention relates to an operator's cab well suited for use in work vehicles such as bulldozers.

BACKGROUND ART

In conventional bulldozers for instance, a power train composed of an engine, transmission and others is provided in a main frame having an undercarriage, and an operator's cab for a work vehicle (hereinafter referred to as "operator's cab") is mounted over the power train.

The operator's cab has a floor frame that constitutes the framework of the base part of the operator's cab and a cab frame that is mounted on the floor frame to constitute the framework of the main body part of the operator's cab.

The floor part of the floor frame of the operator's cab is provided with an opening used for maintenance of the power train located thereunder. This opening for maintenance is usually closed up by a lid body attached to the floor frame. During maintenance of the power train, the lid body is removed from the floor frame so that the power train becomes accessible through the opening for maintenance which has been exposed.

In one known structure such as disclosed in Patent Literature 1, the floor part of the floor frame and the lid body used for closing the opening for maintenance defined in the floor part are both of a hollow box-like structure so that the noise made by the power train located under the floor frame can be suppressed.

CITATION LIST

Patent Literature

Patent Literature 1: JP-A-2004-306911

Mounted on the rear half portion of the lid body used for closing the opening for maintenance is an operator's seat where the operator sits. An air conditioning system (hereinafter referred to as "air conditioner") is installed on the floor frame, being located in a position behind this operator's seat.

A face air outlet, a defrost air outlet and the like are provided in the front part of the room of the operator's cab, whereas a rear air outlet and the like are provided in the rear part of the room of the operator's cab.

The face air outlet stated herein is an air outlet for sending supply air blasted from the air conditioner to the face and chest of the operator sitting on the operator's seat. The defrost air outlet is an air outlet for sending supply air blasted from the air conditioner to the front window glass and door glass of a cab frame. The rear air outlet is an air outlet for sending supply air blasted from the air conditioner to the back of the head of the operator sitting on the operator's seat as well as his upper back and to the rear window glass.

In view of the layout in which the air conditioner is provided in the rear part of the room of the operator's cab whereas the face air outlet and the defrost air outlet are provided in the front part of the room of the operator's cab, an air-conditioning duct is needed to guide supply air from the air conditioner to the front part of the room of the operator's cab. To keep wider room space, this air-conditioning duct is placed underneath the floor part (the bottom surface of the cab frame) of the floor frame and exposed without a special thermal insulating means provided therefor.

This disadvantageously causes the supply air flowing in the air-conditioning duct to be heated by the heat transmitted from the power train, resulting in a considerable loss of the cooling power.

In addition, the rear air outlet sends the supply air having a preset temperature to the back of the head of the operator and his upper back whereas the face air outlet sends the supply air having a temperature higher than the preset temperature to the face and chest of the operator. This causes another problem that the supply air varying in temperature is blown at the operator and, in consequence, the operator will have feeling of discomfort.

SUMMARY OF INVENTION

Problem to be Solved by the Invention

The invention is directed to overcoming the foregoing problems and a primary object of the invention is to provide an operator's cab for a work vehicle, which is capable of providing sound insulation properties without spoiling ease of maintenance while ensuring the thermal insulation properties of the air-conditioning duct.

Means for solving the Problem

The above object can be accomplished by an operator's cab for a work vehicle according to the invention, the operator's cab having a floor part of a hollow box-like structure, wherein the floor part has an opening for maintenance,
wherein an upper inspection cover and a lower inspection cover are provided for closing the opening for maintenance and spaced in a vertical direction so as to be attachable and detachable relative to the opening for maintenance; and
wherein an air-conditioning duct, which can be disassembled, is provided in a space between the upper inspection cover and the lower inspection cover, for circulating supply air sent from an air conditioning system.

It is desirable for the invention that the air-conditioning duct can be divided at a position along a flow passage of the supply air flowing in the air-conditioning duct and the upper inspection cover and the lower inspection cover can be divided at the same position as the dividing position of the air-conditioning duct.

Preferably, the air-conditioning duct is disposed so as to extend in a front-rear direction of the floor part and can be divided into a front duct and a rear duct, and the dividing position is located in front of an operator's seat mounted on the floor part.

Preferably, the air-conditioning duct is disposed at a middle position of the opening for maintenance with respect to a crosswise direction thereof.

Advantageous Effects of Invention

In the invention, the lid body for closing the opening for maintenance defined in the floor part of the floor frame is constituted by an upper inspection cover and a lower inspection cover which are vertically arranged with spacing therebetween, so that an air layer is formed between the upper inspection cover and the lower inspection cover. This enables it to suppress the noise transmitted from an area under the floor frame.

In addition, the air-conditioning duct is positioned within a double floor constituted by the upper inspection cover and the lower inspection cover, whereby the heat transmitted from an area under the floor frame can be shut off by the lower inspection cover whereas the air layer formed between the upper inspection cover and the lower inspection cover can function as a thermal insulating layer. Accordingly, the supply air flowing in the air-conditioning duct can be prevented from being heated by the heat transmitted from the area under the floor frame so that the loss of the cooling power can be prevented.

The invention exhibits the effect of providing sound insulation properties while ensuring the thermal insulation properties of the air-conditioning duct.

In the invention, the air-conditioning duct may be positioned between the upper inspection cover and the lower inspection cover such that it can be disassembled. When performing the maintenance of the power train disposed underneath the floor frame for instance, the above arrangement makes it possible to expose the opening for maintenance by dismounting the upper inspection cover from the floor frame, disassembling the air-conditioning duct, and then dismounting the lower inspection cover from the floor frame. Thanks to the arrangement in which the power train can be accessed through the opening for maintenance that has been exposed, the ease of maintenance of the power train is not marred.

In addition, the air-conditioning duct may be divided into a front duct and a rear duct which can be individually disassembled, and the dividing position of the air-conditioning duct may be located in front of the operator's seat. This enables it to perform the maintenance without dismounting the operator's seat in cases where the maintenance can be performed through only the front portion of the opening.

Further, the air-conditioning duct may be disposed at the middle position of the opening for maintenance with respect to a crosswise direction thereof. This enables it to more easily provide duct's sectional area necessary for air conditioning, compared to the case where the air-conditioning duct is positioned such that it cannot be seen from the opening for maintenance.

It should be noted that the term "disassembling of the air-conditioning duct" stated herein means that a portion of the duct located within the opening necessary for maintenance is disconnected from a portion of the duct located outside the opening. The term "dividing of the air-conditioning duct" means that the air-conditioning duct that is placed within the opening for maintenance is divided into, for example, two portions such as a front duct portion and a rear duct portion.

BEST MODE FOR CARRYING OUT THE INVENTION

Referring now to the accompanying drawings, a cab for a work vehicle will be concretely described according to a preferred embodiment of the invention. Whereas the embodiment described hereinbelow is particularly discussed with a case where the invention is applied to a bulldozer that serves as a work vehicle, it is readily apparent that the invention is not limited to this. When the terms "front-back direction" and "crosswise direction" are used herein, it should be understood that these terms are coincident with the front-back and crosswise directions respectively, as they would appear to the operator sitting on the operator's seat unless otherwise noted.

Figure 1:
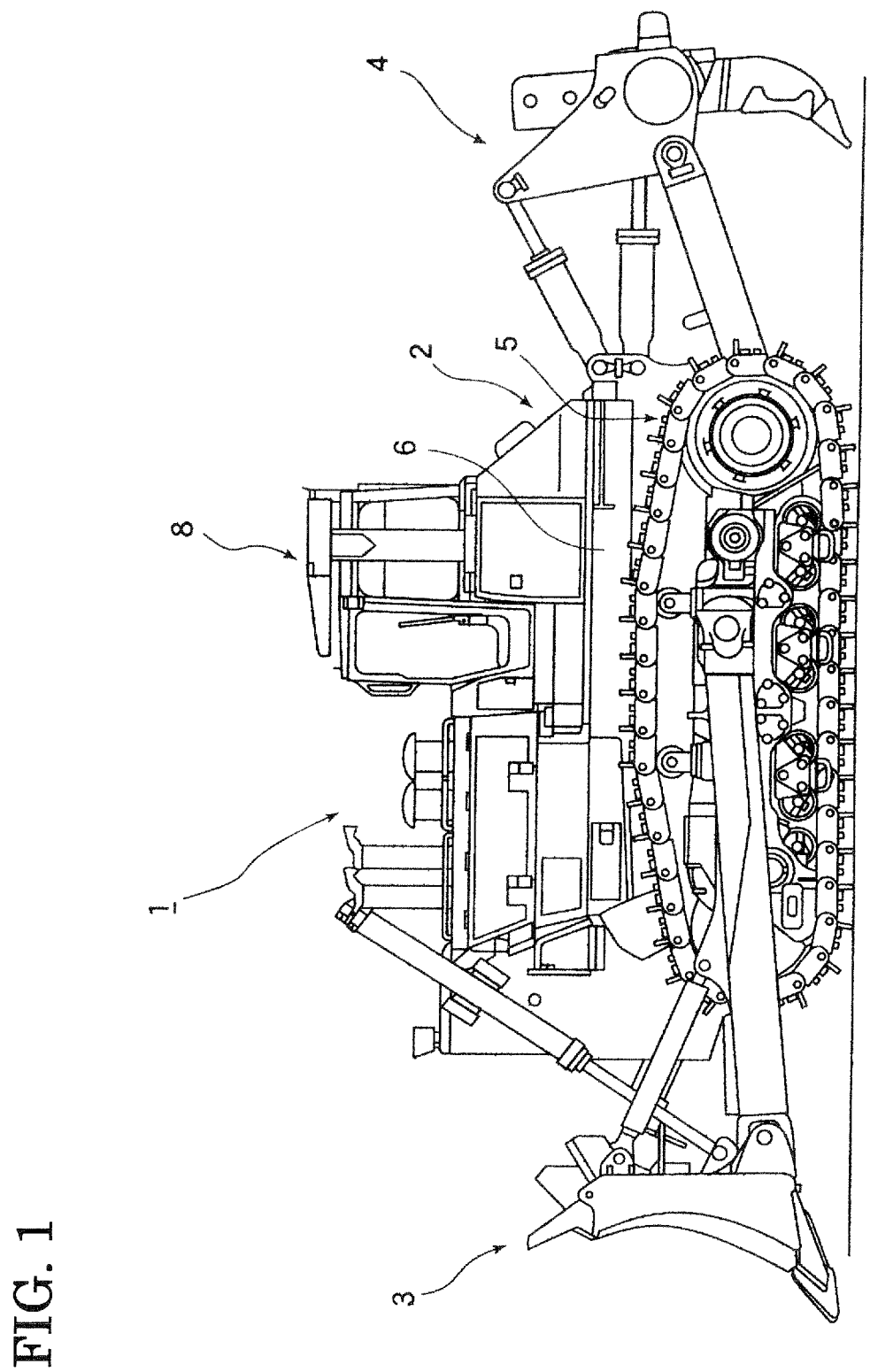
FIG. 1 is an overall side view of a bulldozer having an operator's cab for a work vehicle constructed according to an embodiment of the invention.

The bulldozer 1 shown in FIG. 1 is composed of a front work implement (blade) 3 and a rear work implement (ripper) 4, these implements being mounted on a tractor 2 that serves as a vehicle body.

A power train 7 (see FIG. 2) is mounted on a main frame 6 having an undercarriage 5 of the tractor 2, whereas an operator's cab for a work vehicle 8 (hereinafter referred to as "operator's cab 8") is mounted over the power train 7.

Figure 2:
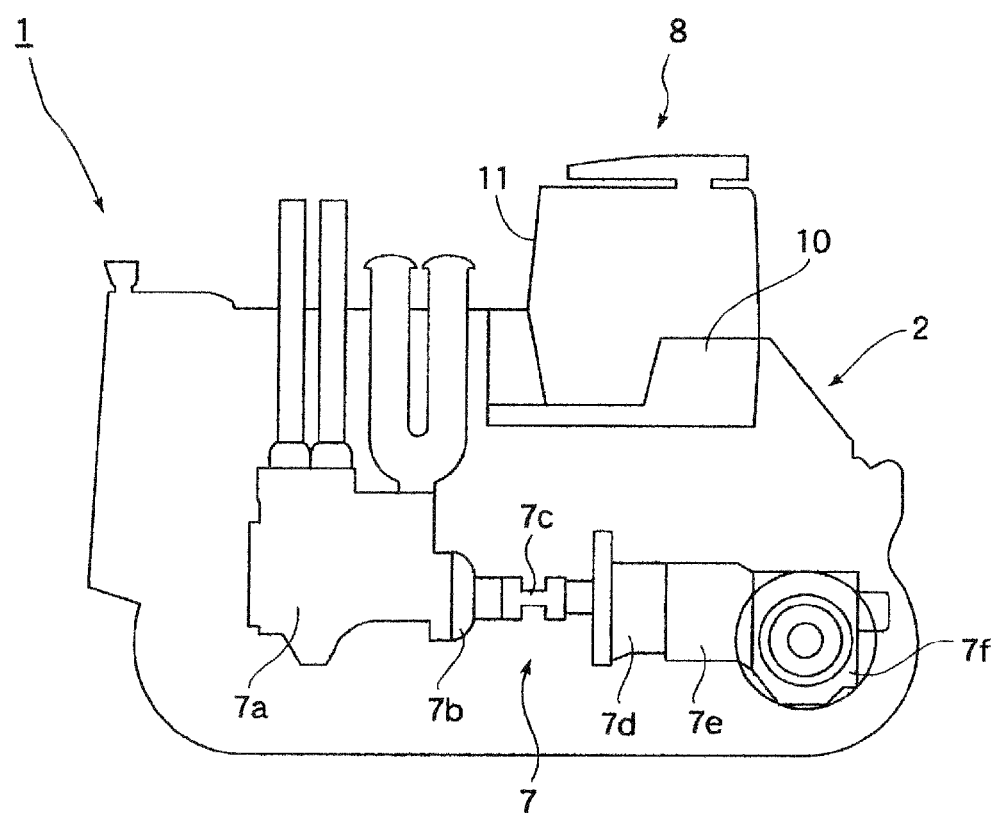
FIG. 2 is an explanatory view showing the positional relationship between a power train and the operator's cab.

As shown in FIG. 2, the power train 7 is composed mainly of an engine 7a, a damper 7b, a universal joint 7c, a torque convertor 7d, a transmission 7e and a final reduction gear device 7f, these members being aligned in order in a direction from its front side (left side in the drawing) toward its rear side (right side in the drawing).

Figure 3:
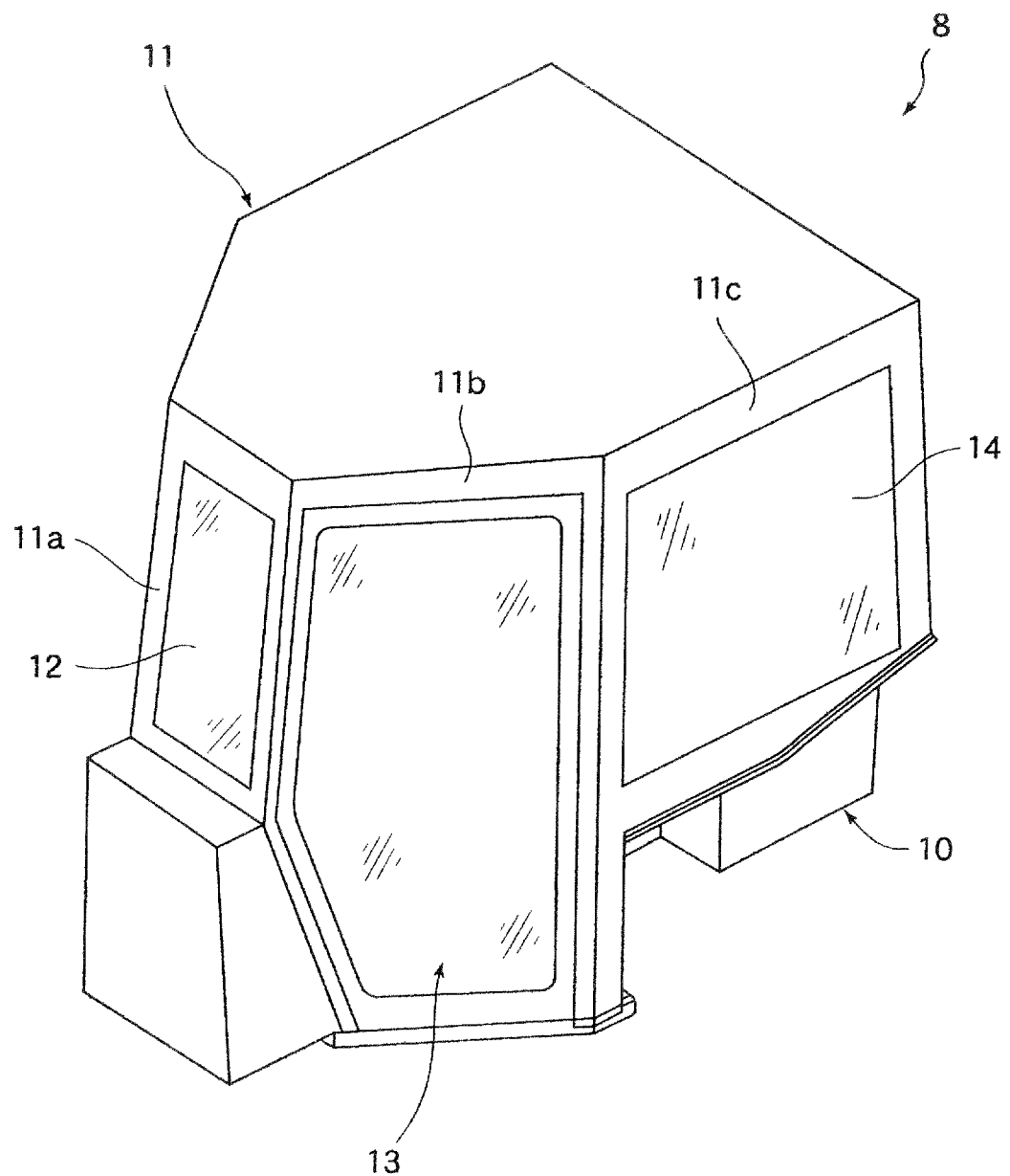
FIG. 3 is an external perspective view of the operator's cab for a work vehicle according to the embodiment.

As illustrated in FIG. 3, the operator's cab 8 includes a floor frame 10 that constitutes the framework of the base part of the operator's cab 8 and a cab frame 11 that is assembled onto the floor frame 10, constituting the framework of the main body of the operator's cab 8.

The cab frame 11 has a front window frame 11a, a door frame 11b, a side window frame 11c and a rear window frame (not shown). The front window frame 11a has a front window glass 12 fitted therein, the door frame 11b has a door 13 fitted therein, the side window frame 11c has a side window glass 14 fitted therein and the rear window frame has a rear window glass (not shown) fitted therein.

Figure 4:
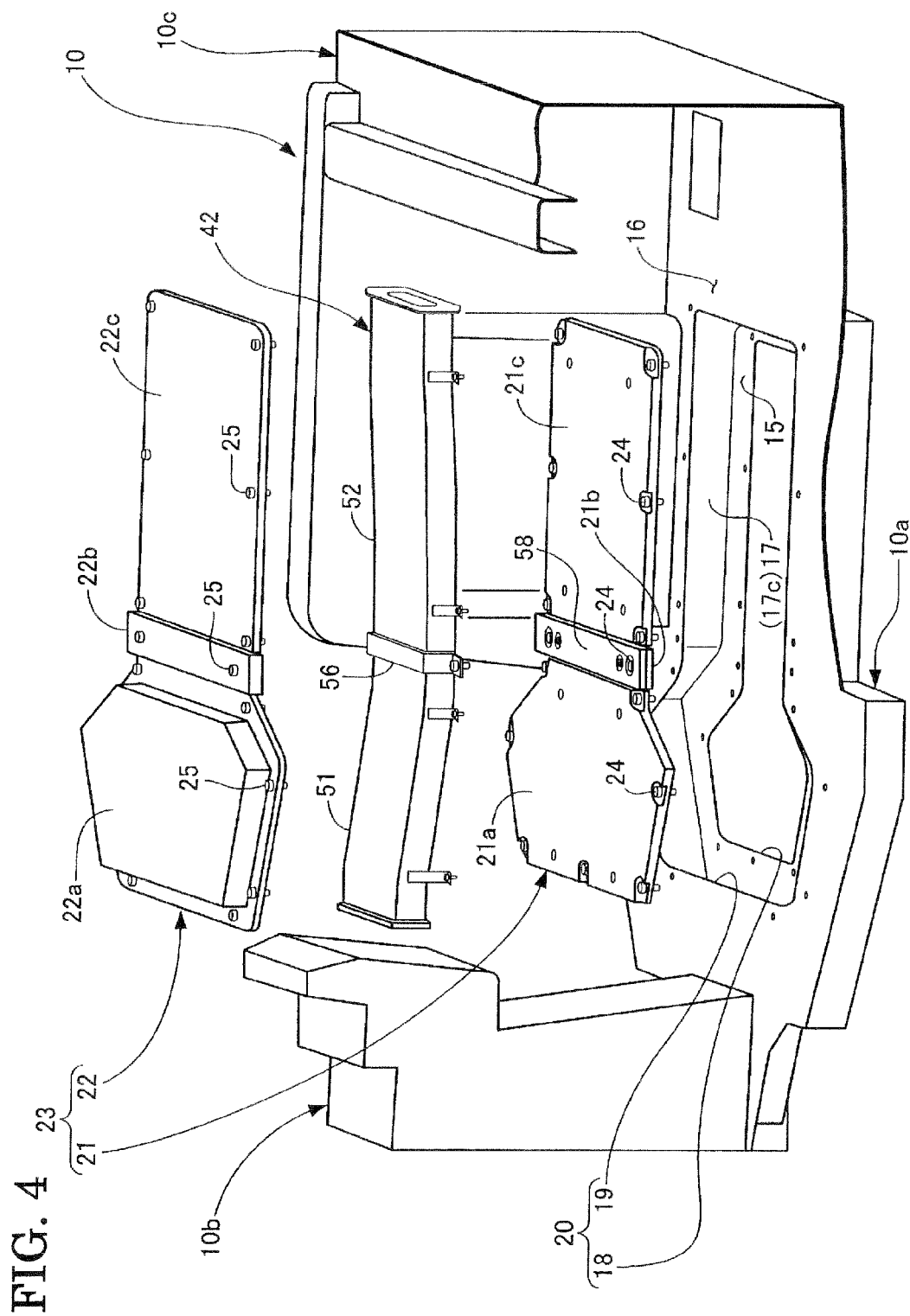
FIG. 4 is a perspective view of the operator's cab for a work vehicle according to the embodiment, a substantial part of which is exploded.

The floor frame 10 is mounted on the main frame 6 of the work vehicle as the base part of the operator's cab 8. As illustrated in FIG. 4, the floor frame 10 is composed mainly of a flat floor base 10a that constitutes a floor part; a front frame 10b that is formed upright at the front part of the floor base 10a; and a rear frame 10c that is formed upright at the rear part of the floor base 10a.

The floor base 10a is composed of a lower plate 15 and an upper plate 16 which are combined by a web plate 17, the lower plate 15 being arranged so as to face the power train 7 (see FIG. 2) placed thereunder whereas the upper plate 16 is placed at a position above and opposed to the lower plate 15 with specified spacing therebetween. The lower plate 15 and the upper plate 16 thus constitute a double floor and the floor base 10a has a hollow box-like structure with an air layer formed therein.

The web plate 17 is composed of a front web plate 17a (see FIG. 5) positioned in the front part of the floor base 10a, a rear web plate 17b positioned in the rear part of the floor base 10a; and a side web plate 17c (see FIG. 4) positioned in side parts of the floor base 10a so as to connect the front web plate 17a and the rear web plate 17b to each other.

The lower plate 15 is provided with a lower opening for maintenance 18 that passes through the lower plate 15 and is used for maintenance of the power train 7 (see FIG. 2) located thereunder.

The upper plate 16 is provided with an upper opening for maintenance 19 that is similar in shape to and one size larger than the lower opening for maintenance 18 defined in the lower plate 15.

The lower opening for maintenance 18 and the upper opening for maintenance 19 have such a positional relationship that the former is located inside the latter when viewed in plan.

An opening for maintenance 20 for use during maintenance of the power train 7 is constituted by the lower opening for maintenance 18 and the upper opening for maintenance 19.

Normally, the lower opening for maintenance 18 is closed up by a lower inspection cover 21 whereas the upper opening for maintenance 19 is closed up by an upper inspection cover 22.

The lower inspection cover 21 and the upper inspection cover 22 constitutes a lid body 23 which, in turn, constitutes a double floor for closing the opening for maintenance 20 and has a hollow box-like structure with an air layer formed therein. The lower inspection cover 21 and the upper inspection cover 22 can be individually removed from the opening for maintenance 20.

The lower inspection cover 21 is constituted by a lower front inspection cover 21a, a lower intermediate inspection cover 21b and a lower rear inspection cover 21c. The lower front inspection cover 21a and the lower rear inspection cover 21c are aligned in a front-back direction with a small clearance gap formed therebetween, and the lower intermediate inspection cover 21b is placed so as to close up this clearance gap. The lower front inspection cover 21a, the lower intermediate inspection cover 21b and the lower rear inspection cover 21c are respectively detachably secured to the rim of the lower opening for maintenance 18 by a fastening device 24.

The lower inspection cover 21 has a structure according to which, it can be largely divided into front and rear portions, that is, the lower front inspection cover 21a and the lower rear inspection cover 21c. The clearance gap of the dividing position between the lower front inspection cover 21a and the lower rear inspection cover 21c is closed up by the lower intermediate inspection cover 21b.

The upper inspection cover 22 is constituted by an upper front inspection cover 22a, an upper intermediate inspection cover 22b and an upper rear inspection cover 22c. The upper front inspection cover 22a and the upper rear inspection cover 22c are aligned in a front-back direction with a small clearance gap formed therebetween, and the upper intermediate inspection cover 22b is placed so as to close this clearance gap. The upper front inspection cover 22a, the upper intermediate inspection cover 22b and the upper rear inspection cover 22c are respectively detachably secured to the rim of the upper opening for maintenance 19 by a fastening device 25.

Similarly to the lower inspection cover 21, the upper inspection cover 22 is formed such that it can be largely divided into front and rear portions, that is, the upper front inspection cover 22a and the upper rear inspection cover 22c. The clearance gap of the dividing position between the upper front inspection cover 22a and the upper rear inspection cover 22c is closed up by the upper intermediate inspection cover 22b.

The dividing position for the front and rear portions of the lower inspection cover 21 is coincident with that of the upper inspection cover 22. The lower intermediate inspection cover 21b and the upper intermediate inspection cover 22b are so disposed as to overlap each other when viewed in plan.

Figure 5:
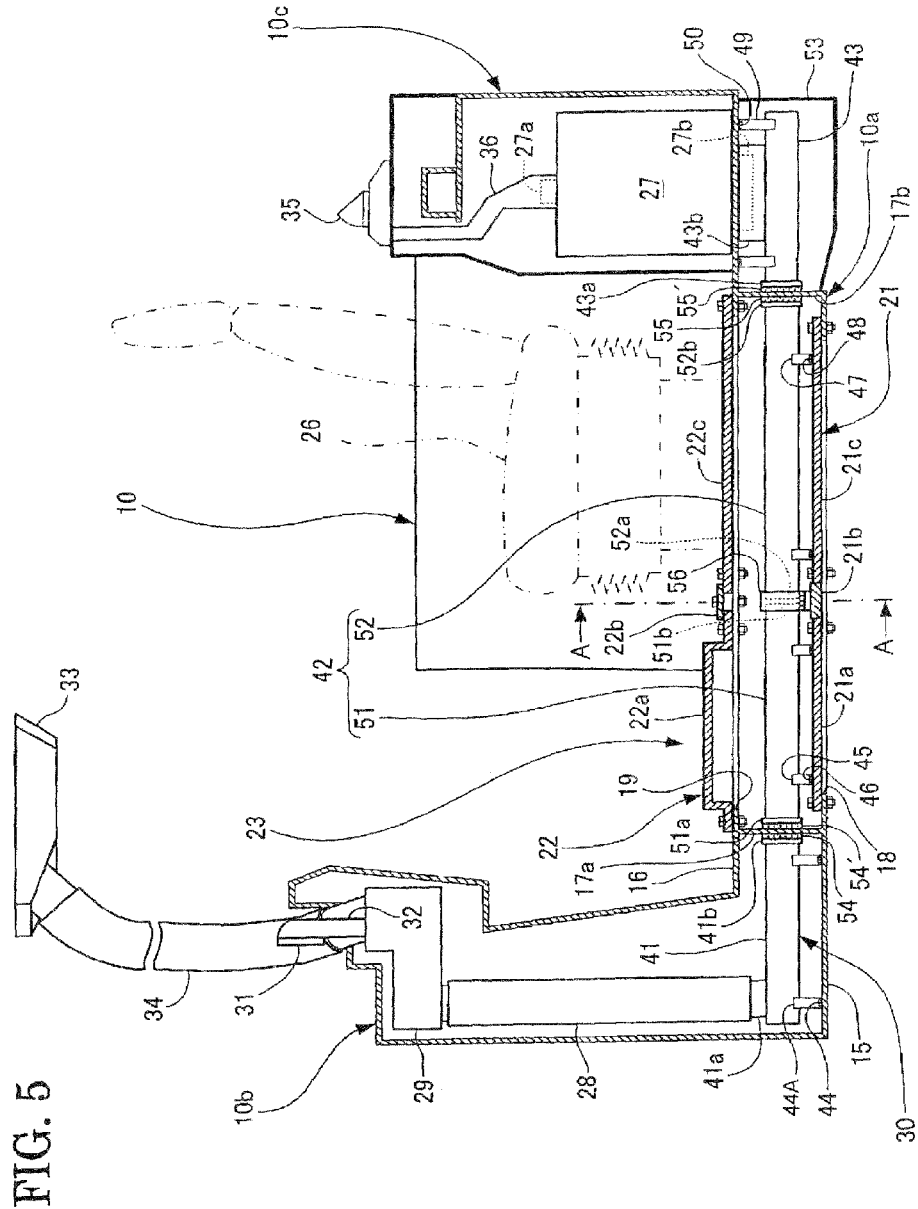
FIG. 5 is a longitudinal sectional view showing a substantial part of the operator's cab for a work vehicle according to the embodiment.

As illustrated in FIG. 5, an operator's seat (hereinafter referred to as "ope-seat") 26 on which the operator can sit is provided on the upper rear inspection cover 22c. An air conditioning system 27 (hereinafter referred to as "air conditioner 27") is installed on the floor base 10a, being located at a position behind this ope-seat 26. This air conditioner 27 is provided with an upper air outlet 27a opened upward and a lower air outlet 27b opened downward. They serve as air outlets for sending conditioned air the temperature of which is controlled to be equal to a preset value.

The front frame 10b of the floor frame 10 is of a box-like structure. Stored in this front frame 10b is a columnar duct 28 that stands upright relative to the floor base 10a. Connected to the upper end of the columnar duct 28 is a relay box 29.

The lower air outlet 27b of the air conditioner 27 is connected to the columnar duct 28 by a floor duct 30 (that corresponds to the "air conditioning duct" of the invention). This makes it possible to send the supply air from the lower air outlet 27b of the air conditioner 27 into the relay box 29 by way of the floor duct 30 and the columnar duct 28.

In an area in the vicinity of and above the relay box 29, a defrost air outlet 31 is provided so as to be oriented toward the front window glass 12 (see FIG. 3). The defrost air outlet 31 and the relay box 29 are connected to each other by a defrost air outlet duct 32 so that the supply air sent from the air conditioner 27 into the relay box 29 is blasted from the defrost air outlet 31 toward the front window glass 12.

In an area above the relay box 29 and in the vicinity of the ceiling of the cab frame 11 (see FIG. 3), a face air outlet 33 is provided so as to be oriented toward the face and chest of the operator sitting on the ope-seat 26. The face air outlet 33 and the relay box 29 are connected to each other by a face air outlet duct 34 so that the supply air sent from the air conditioner 27 into the relay box 29 is blasted from the face air outlet 33 toward the face and chest of the operator sitting on the ope-seat 26.

A rear air outlet 35 is provided at a position above the air conditioner 27 so as to be oriented toward the back of the head of the operator sitting on the ope-seat 26 and toward his upper back. The rear air outlet 35 and the upper air outlet 27a of the air conditioner 27 are connected to each other by a rear air outlet duct 36, so that the supply air from the air conditioner 27 is blasted from the rear air outlet 35 toward the back of the head of the operator sitting on the ope-seat 26 and toward his upper back.

Next, the structure of the floor duct 30 will be described in more details below.

The floor duct 30 is an air-conditioning duct having square section. It has an elongated shape, extending in a front-back direction so as to guide the supply air from the air conditioner 27 installed in the rear part of the room of the operator's cab 8 into the front part of the room of the cab 8. This floor duct 30 is composed mainly of a front floor duct 41, an intermediate floor duct 42, and a rear floor duct 43. The floor duct 30 is formed at an internal middle position of the floor frame 10 of a box-like structure with respect to a crosswise direction thereof such that it extends in a front-rear direction.

The front floor duct 41 has a front duct connection 41a connected to the lower end of the columnar duct 28 and a rear duct connection 41b opened backward. The front floor duct 41 is located in the space between the upper plate 16 and the lower plate 15 within the front part of the floor base 10a and is detachably secured onto the lower plate 15 through support cramps 44A with the aid of fastening devices 44. The rear duct connection 41b is in butt contact with a front web plate 17a through a sealing member 54. The front web plate 17a has an opening corresponding to the opening of the rear duct connection 41b.

The intermediate floor duct 42 is composed of a first intermediate floor duct 51 and a second intermediate floor duct 52 and disposed in a middle position of the opening for maintenance 20 with respect to its crosswise direction so as to extend in a front-back direction.

The first intermediate floor duct 51 has a front duct connection 51a connected to the front floor duct 41. At a position that matches the rear duct connection 41b of the front floor duct 41, the front duct connection 51a is in butt contact with the front web plate 17a through a sealing member 54'. Further, the first intermediate floor duct 51 has a rear duct connection 51b opened backward.

The first intermediate floor duct 51 is disposed in the space between the upper front inspection cover 22a and the lower front inspection cover 21a and detachably secured onto the lower front inspection cover 21a through support cramps 45 with the aid of fastening devices 46.

The second intermediate floor duct 52 has a front duct connection 52a that is in butt contact with the rear duct connection 51b of the first intermediate floor duct 51 and a rear duct connection 52b opened backward. The second intermediate floor duct 52 is disposed in the space between the upper rear inspection cover 22c and the lower rear inspection cover 21c and detachably secured onto the lower rear inspection cover 21c through support cramps 47 with the aid of fastening devices 48. The rear duct connection 52b is in butt contact with a rear web plate 17b through a sealing member 55. The rear web plate 17b has an opening corresponding to the opening of the rear duct connection 52b.

The rear floor duct 43 has a front duct connection 43a connected to the intermediate floor duct 42. At a position that matches the rear duct connection 52b of the second intermediate floor duct 52, the front duct connection 43a is in butt contact with the rear web plate 17b through a sealing member 55'. The rear floor duct 43 further includes a rear duct connection 43b connected to the lower air outlet 27b of the air conditioner 27.

The rear floor duct 43 is disposed underneath the upper plate 16 within the rear part of the floor base 10a and detachably secured to the upper plate 16 through suspending support cramps 49 with the aid of fastening devices 50.

An underside cover 53 for covering the rear floor duct 43 from below is detachably mounted to the floor base 10a.

As described earlier, the sealing member 54, the front web plate 17a and the sealing member 54' are interposed between the rear duct connection 41b of the front floor duct 41 and the front duct connection 51a of the first intermediate floor duct 51. It should be noted that the sealing member 54 is preliminarily attached to an end face of the rear duct connection 41b of the front floor duct 41. The sealing member 54' is preliminarily attached to an end face of the front duct connection 51a of the first intermediate floor duct 51. Also, the sealing member 54' is preliminarily attached to an end face of the front duct connection 51a of the first intermediate floor duct 51.

The sealing member 55, the rear web plate 17b and the sealing member 55' are interposed between the rear duct connection 52b of the second intermediate floor duct 52 and the front duct connection 43a of the rear floor duct 43. It should be noted the sealing member 55 is preliminarily attached to an end face of the rear duct connection 52b of the second intermediate floor duct 52. Also, the sealing member 55' is preliminarily attached to an end face of the front duct connection 43a of the rear floor duct 43.

The rear duct connection 51b of the first intermediate floor duct 51 is in butt contact with the front duct connection 52a of the second intermediate floor duct 52 at a position between the lower intermediate inspection cover 21b and the upper intermediate inspection cover 22b. Provided at the position where the first intermediate floor duct 51 is in butt contact with the second intermediate floor duct 52 is a duct contact part retainer 56 that is formed so as to cover the butt contact position from above.

Figure 6:
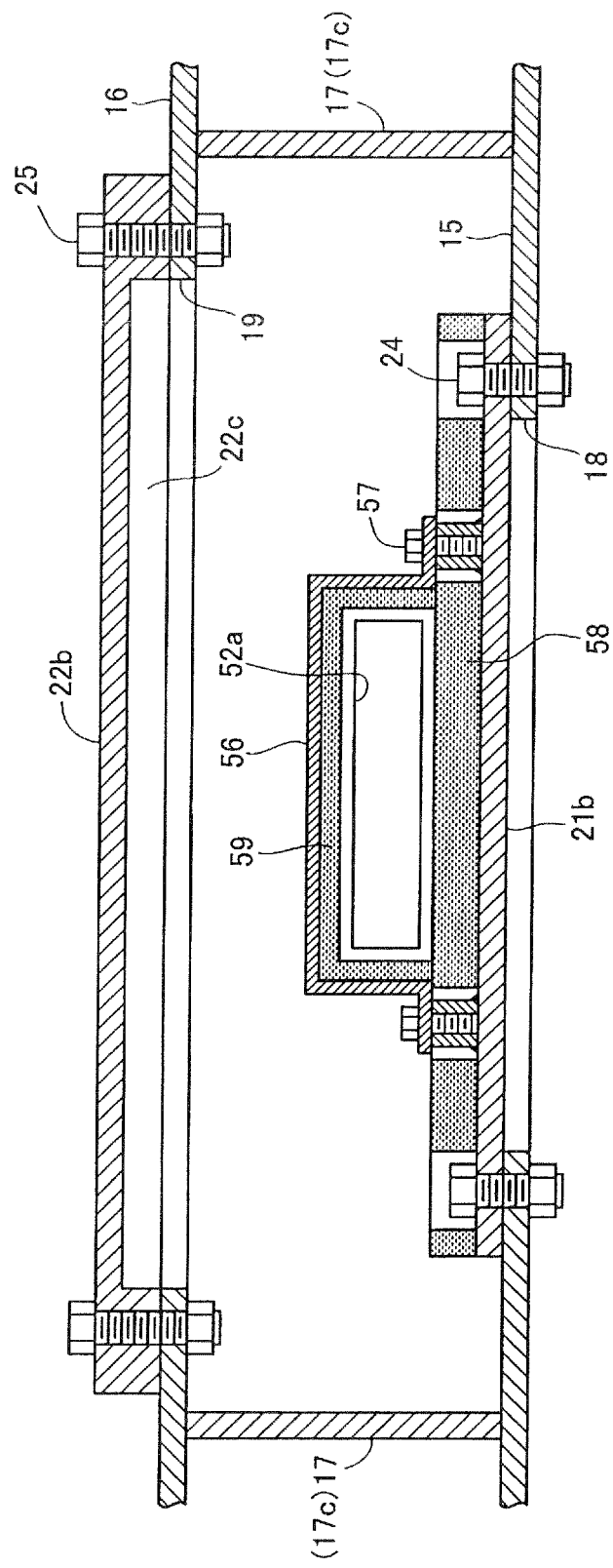
FIG. 6 is a cross-sectional view cut along line A-A of FIG. 5.

FIG. 6 is a sectional view taken along line A-A (the dividing position for the duct and the covers) of FIG. 5. As shown in this view, the duct contact part retainer 56 is detachably secured onto the lower intermediate inspection cover 21b with the aid of fastening devices 57. A sealing member 58 is attached to the upper face of the lower intermediate inspection cover 21b so as to be contactable with the butt contact position where the first intermediate floor duct 51 is in butt contact with the second intermediate floor duct 52. A sealing member 59 is attached to the inner face of the duct contact part retainer 56 so as to be contactable with the butt contact position where the first intermediate floor duct 51 is in butt contact with the second intermediate floor duct 52. In this way, the butt contact position of the first intermediate floor duct 51 and the second intermediate floor duct 52 is held between the lower intermediate inspection cover 21b having the sealing member 58 attached thereto and the duct contact part retainer 56 having the sealing member 59 attached thereto, so that the butt contact position of the first intermediate floor duct 51 and the second intermediate floor duct 52 can be hermetically sealed.

In the operator's cab 8 having the above structure, an air layer is formed between the upper plate 16 and the lower plate 15 and formed between the upper inspection cover 22 and the lower inspection cover 21 as shown in FIG. 5, so that the noise from the power train 7 (see FIG. 2) located underneath the floor frame 10 can be suppressed.

In the operator's cab 8 of this embodiment, the front floor duct 41 is disposed within the double floor defined by the upper plate 16 and the lower plate 15 in the front part of the floor base 10a. Therefore, the heat transmitted from the power train 7 (see FIG. 2) located underneath the floor frame 10 can be shut off by the lower plate 15 while the air layer located between the upper plate 16 and the lower plate 15 can function as a thermal insulating layer.

In addition, the intermediate floor duct 42 is disposed within the double floor defined by the upper inspection cover 22 and the lower inspection cover 21. Therefore, the heat transmitted from the power train 7 can be shut off by the lower inspection cover 21 while the air layer located between the upper inspection cover 22 and the lower inspection cover 21 can function as a thermal insulating layer.

Further, the rear floor duct 43 is disposed under the upper plate 16 in the rear part of the floor base 10a, and the underside cover 53 for covering the rear floor duct 43 from below is mounted on the floor base 10a, Therefore, the heat transmitted from the power train 7 can be shut off by the underside cover 53 while the air layer located between the upper plate 16 and the underside cover 53 can function as a thermal insulating layer.

Accordingly, the supply air coming from the air conditioner 27 and flowing in the floor duct 30 can be prevented from being heated by the heat transmitted from the power train 7 so that the loss of the cooling power can be prevented. Further, since the supply air having a preset temperature is blasted from the face air outlet 33 and the rear air outlet 35 toward the operator, the operator does not have feeling of discomfort.

The cab 8 of this embodiment exhibits the effect of providing sound insulation properties while ensuring the thermal insulation properties of the floor duct 30.

In the operator's cab 8 of this embodiment, the following operation is performed to entirely expose the opening for maintenance 20 as shown in FIG. 4 in order to perform maintenance of the power train 7. It should be noted that the ope-seat 26 (see FIG. 5) has been dismounted beforehand.

First, the upper front inspection cover 22a, the upper intermediate inspection cover 22b and the upper rear inspection cover 22c, which constitute the upper inspection cover 22, are respectively removed from the upper plate 16 of the floor base 10a. Thanks to the structure in which the upper inspection cover 22 is largely dividable into the upper front inspection cover 22a and the upper rear inspection cover 22c, the upper inspection cover 22 has the advantage that it can be easily handled during attachment and detachment thereof.

After the duct contact part retainer 56 is detached from the lower intermediate inspection cover 21b, the first intermediate floor duct 51 is detached from the lower front inspection cover 21a whereas the second intermediate floor duct 52 is detached from the lower rear inspection cover 21c.

Subsequently, the lower front inspection cover 21a, the lower intermediate inspection cover 21b and the lower rear inspection cover 21c, which constitute the lower inspection cover 21, are respectively removed from the lower plate 15 of the floor base 10a. Thanks to the structure in which the lower inspection cover 21 is largely dividable into the lower front inspection cover 21a and the lower rear inspection cover 21c, the lower inspection cover 21 has the advantage that it can be easily handled during attachment and detachment thereof.

By thus disassembling and detaching the intermediate floor duct 42 of the air-conditioning duct, the opening for maintenance 20 can be entirely exposed and, in consequence, the power train 7 can be accessed through the opening for maintenance 20 that has been entirely exposed.

To expose the front half of the opening for maintenance 20 for performing maintenance of the power train 7, the following operation is performed. It should be noted that there is no need to dismount the ope-seat 26 because the front half of the opening for maintenance 20 is located in front of the ope-seat 26.

First, the upper front inspection cover 22a and the upper intermediate inspection cover 22b are respectively removed from the upper plate 16 of the floor base 10a.

After the duct contact part retainer 56 is detached from the lower intermediate inspection cover 21b, the first intermediate floor duct 51 is detached from the lower front inspection cover 21a.

Then, the lower front inspection cover 21a is removed from the lower plate 15 of the floor base 10a.

By disassembling the first intermediate floor duct 51 thus divided, the front half portion of the opening for maintenance 20 is revealed.

To expose only the rear half of the opening for maintenance 20 for performing maintenance of the power train 7, the following operation is performed. It should be noted that the ope-seat 26 (see FIG. 5) has been dismounted beforehand.

First, the upper rear inspection cover 22c and the upper intermediate inspection cover 22b are respectively removed from the upper plate 16 of the floor base 10a.

After the duct contact part retainer 56 is detached from the lower intermediate inspection cover 21b, the second intermediate floor duct 52 is detached from the lower rear inspection cover 21c.

Then, the lower rear inspection cover 21c is removed from the lower plate 15 of the floor base 10a.

By disassembling the second intermediate floor duct 52 thus divided, the rear half portion of the opening for maintenance 20 is revealed.

According to the operator's cab 8 of this embodiment, the front/rear dividing position of the intermediate floor duct 42 is coincident with the front/rear dividing position of the lid body 23. Specifically, the butt contact position between the first intermediate floor duct 51 and the second intermediate floor duct 52, the dividing position of the upper inspection cover 22, and the dividing position of the lower inspection cover 21 are coincident with one another. Therefore, only the front half portion of the opening for maintenance 20 can be exposed by removing the upper front inspection cover 22a, the first intermediate floor duct 51 and the lower front inspection cover 21a, and, in consequence, the power train 7 can be accessed through the half front portion of the opening for maintenance 20 that has been exposed.

Similarly, only the rear half portion of the opening for maintenance 20 can be exposed by removing the upper rear inspection cover 22c, the second intermediate floor duct 52 and the lower rear inspection cover 21c and therefore the power train 7 can be accessed through the rear half portion of the opening for maintenance 20 that has been exposed.

In this way, only the front half portion or rear half portion of the opening for maintenance 20 can be exposed in accordance with the contents of the maintenance operation, which leads to a reduction in the labor required for the maintenance operation.

Although the operator's cab for a work vehicle of the invention has been described according to one embodiment thereof, the invention is not necessarily limited to the particular configuration discussed in the embodiment shown herein and various changes and modifications are made to the configuration without departing from the spirit and scope of the invention.

INDUSTRIAL APPLICABILITY

Since the operator's cab for a work vehicle is capable of providing sound insulation properties without spoiling ease of maintenance while ensuring the thermal insulation properties of the air-conditioning duct, it can be well suited for use in applications in which the operator's cab is mounted, for instance, over a power train.

REFERENCE NUMERALS

1: bulldozer (work vehicle)
8: operator's cab (operator's cab for a work vehicle)
10: floor frame
10a: floor base (floor part)
20: opening for maintenance
21: lower inspection cover
22: upper inspection cover
23: lid body
26: operator's seat
27: air conditioner (air conditioning system)
30: floor duct (air conditioning duct)
42: intermediate floor duct
51: first intermediate floor duct (front duct)
52: second intermediate floor duct (rear duct)

The invention claimed is:

1. An operator's cab for a work vehicle, the cab comprising:
   a floor part having a hollow box-like structure,
   wherein the floor part has an opening for maintenance;
   wherein an upper inspection cover and a lower inspection cover are provided for closing the opening and are spaced in a vertical direction so as to be attachable and detachable relative to the opening;
   wherein an air-conditioning duct is provided in a space between the upper inspection cover and the lower inspection cover, for circulating supply air sent from an air conditioning system,
   wherein the air-conditioning duct is disposed so as to extend in a front-rear direction of the floor part, and is dividable into a front duct and a rear duct; and
   wherein a dividing position to divide the air-conditioning duct into the front duct and the rear duct is located in front of an operator's seat which is mounted on the upper inspection cover.

2. The operator's cab for a work vehicle according to claim 1,
   wherein the upper inspection cover and the lower inspection cover are dividable at a same position as the dividing position of the air-conditioning duct.

3. The operator's cab for a work vehicle according to claim 1, wherein the air-conditioning duct is disposed at a middle position of the opening with respect to a crosswise direction thereof.

* * * * *